United States Patent
Braun et al.

(10) Patent No.: US 7,202,898 B1
(45) Date of Patent: Apr. 10, 2007

(54) SELF GATING PHOTOSURFACE

(75) Inventors: Ori J. Braun, Tel-Aviv (IL); Gavriel J. Iddan, Haifa (IL); Giora Yahav, Haifa (IL)

(73) Assignee: 3DV Systems Ltd., Yokneam Eilit (IL)

( * ) Notice: Subject to any disclaimer, the term of this patent is extended or adjusted under 35 U.S.C. 154(b) by 0 days.

(21) Appl. No.: 09/868,405

(22) PCT Filed: Dec. 16, 1998

(86) PCT No.: PCT/IL98/00611

§ 371 (c)(1),
(2), (4) Date: Jun. 14, 2001

(87) PCT Pub. No.: WO00/36372

PCT Pub. Date: Jun. 22, 2000

(51) Int. Cl.
*H04N 5/335* (2006.01)
*G01C 3/08* (2006.01)
*G01N 21/86* (2006.01)

(52) U.S. Cl. ............... 348/301; 348/308; 356/4.01; 250/559.08

(58) Field of Classification Search ............ 348/301, 348/308, 302, 296, 297, 263; 356/4.01, 3.07; 250/332, 559.08
See application file for complete search history.

(56) References Cited

U.S. PATENT DOCUMENTS

| 4,221,475 A | * | 9/1980 | Tamura ............ 396/137 |
| 4,628,469 A | | 12/1986 | White |
| 4,979,816 A | | 12/1990 | White |
| 5,015,868 A | * | 5/1991 | Park ............ 250/559.08 |
| 5,345,266 A | | 9/1994 | Denyer |
| 5,430,290 A | | 7/1995 | Merle et al. |
| 5,446,529 A | * | 8/1995 | Stettner et al. ............ 356/4.01 |
| 5,682,229 A | | 10/1997 | Wangler |
| 5,898,484 A | * | 4/1999 | Harris ............ 356/4.01 |
| 6,665,010 B1 | * | 12/2003 | Morris et al. ............ 348/297 |

FOREIGN PATENT DOCUMENTS

| WO | WO 99/26083 | 5/1999 |
| WO | WO 00/19705 | 4/2000 |

\* cited by examiner

*Primary Examiner*—Lin Ye

(57) ABSTRACT

A semiconductor surface is provided comprising a plurality of light sensitive pixels wherein each pixel of the plurality of pixels comprises an electronic circuit formed on or in the semiconductor surface, the circuit comprising: a photosensor that generates a signal responsive to light incident thereon at an output thereof; and circuitry that provides a signal responsive to a time lapse between a first time responsive to said signal and a reference time. There is also provided a 3D camera incorporating the semiconductor surface.

31 Claims, 3 Drawing Sheets

SELF GATING PHOTOSURFACE

RELATED APPLICATIONS

The present application is a U.S. national application of PCT/IL98/00611, filed Dec. 16, 1998.

FIELD OF THE INVENTION

The invention relates to cameras that provide measurements of distances to objects and parts of objects that they image and in particular to integrating functions of such cameras on a single chip.

BACKGROUND OF THE INVENTION

Three dimensional optical imaging systems, hereinafter referred to as "3D cameras", that are capable of providing distance measurements to objects and points on objects that they image, are used for many different applications. Among these applications are profile inspection of manufactured goods, CAD verification, robot vision, geographic surveying and imaging objects selectively as a function of distance.

Some 3D cameras use a time of flight technique to measure distances to an object in a scene. A 3D camera of this type usually comprises a light source, such as a laser, which is pulsed or shuttered to illuminate a scene being imaged with light pulses and a gated imaging system for imaging light from the light pulses that is reflected from objects in the scene. The gated imaging system comprises a camera, such as a CCD or CMOS camera, or an IR camera, having a photosensitive surface, hereinafter referred to as a "photosurface", and a gating means for gating the camera open and closed, such as an electro-optical shutter or a gated image intensifier. The reflected light is registered on pixels of the photosurface of the camera only if it reaches the camera when the camera is gated open.

To image a scene and determine distances from the camera to objects in the scene, the scene is generally illuminated with a train of light pulses radiated from the light source. For each radiated light pulse in the train, following an accurately determined delay from the time that the light pulse is radiated, the camera is gated open for a limited period of time hereinafter referred to as a "gate". Light from the light pulse that is reflected from an object in the scene is imaged on the photosurface of the camera if it reaches the camera during the gate. Since the time elapsed between radiating a light pulse and the gate that follows it is known, the time it took imaged light to travel from the light source to the reflecting object in the scene and back to the camera is known. The time elapsed is used to determine the distance to the object.

Some 3D cameras use a geometrical relationship between an incident beam of light that illuminates the surface of an object and light reflected from the incident beam by the surface to determine distances to the object. Generally, at any one time, the incident beam illuminates a limited surface region of the object and distances to the object are measured only for points of the object in the limited surface region. To measure distance to points in different surface regions the position of the beam is changed. Generally, "geometrical" measurements of distances to an object are made using a triangulation technique.

A common "geometrical" method of 3D imaging is active triangulation. In active triangulation, generally, a thin fan beam of laser light illuminates the surface of an object along a thin stripe on the surface. Light reflected from the illuminated stripe is incident on pixels in an appropriate photosurface. Each illuminated pixel in the photosurface is illuminated by light reflected from a different spot on the stripe. The position of an illuminated pixel in the photosurface and the angle, hereinafter the "scan angle", that the plane of the fan beam makes with a reference coordinate system is sufficient to determine three spatial coordinates for the spot on the stripe that reflects light to the pixel. To produce a 3D map of the surface of the object, the scan angle is incremented so that the fan beam scans the surface of the object, illuminating it successively along different closely spaced stripes on the surface. For each of these closely spaced stripes, the spatial coordinates of spots on the stripes corresponding to illuminated pixels are calculated.

3D cameras using time of flight and variations of time of flight techniques to determine distances to an object are described in PCT application PCL/IL98/00476 by some of the inventors of the present application, which PCT application is incorporated herein by reference.

3D cameras using substantially "geometrical" methods for measuring distances to an object are described in PCT application PCT/IL97/00370, also by some of the inventors of the present application, which PCT application is incorporated herein by reference.

SUMMARY OF THE INVENTION

An aspect of a preferred embodiment of the present invention relates to providing a photosurface useable in a 3D camera, which photosurface incorporates gating apparatus for the 3D camera that automatically gates pixels in the photosurface on or off in response to light incident on the pixels.

Another aspect of a preferred embodiment of the present invention relates to providing a photosurface comprising a plurality of pixels, in which each pixel of the plurality of pixels provides information responsive to the duration of a time lapse between a reference time and a time when light is incident on the pixel.

In some preferred embodiments of the present invention the pixels are gated on at the reference time and gated off at the time when light is incident on the pixels.

In some preferred embodiments of the present invention the pixels are gated on when light is incident on the pixels and gated off at the reference time.

Another aspect of some preferred embodiments of the present invention relates to providing a 3D camera that uses a photosurface, in accordance with a preferred embodiment of the present invention, to measure distances to an object using a time of flight technique.

Another aspect of some preferred embodiments of the present invention relates to providing a 3D camera that uses a photosurface, in accordance with a preferred embodiment of the present invention, to measure distances to an object using a triangulation technique.

In accordance with an aspect of a preferred embodiment of the present invention, each pixel in the photosurface includes its own pixel circuit for gating the pixel on or off. The pixel circuit is controllable to gate the pixel on at a reference time, hereinafter referred to as "start time". Once gated on, the pixel circuit subsequently gates the pixel off at a time, hereinafter referred to as "stop time", at which time light to which the pixel is sensitive is incident on the pixel. In some preferred embodiments of the present invention the pixel circuit is gated on when light is incident on the pixel and gated off at a subsequent reference time. In such preferred embodiments of the present invention the start time is the time at which light is incident on the pixel and the stop time is the reference time.

In some preferred embodiments of the present invention, a time lapse between a start time and a stop time of a pixel is determined from an amount of charge accumulated between start time and stop time by a charge integrating means, such as a capacitor, in the pixel circuit.

In a photosurface in accordance with a preferred embodiment of the present invention, the pixel circuit of each pixel of the photosurface comprises a photosensor, a comparator, a flip-flop and a storage capacitor.

When an output of the flip-flop is turned on, current from a suitable current source flows into the storage capacitor. When the output is turned off no current flows into the storage capacitor. The output of the flip-flop is controllable to be turned on by an appropriate signal from a controller connected to a first input of the flip-flop. A second input of the flip-flop is connected to an output of the comparator. The output of the comparator has an on and off state. If the output of the flip-flop is on when the output of the comparator switches from off to on, i.e. when the output of the comparator "turns on", the output of the flip-flop turns off.

Current from the photosensor, hereinafter referred to as "photocurrent", controls when the output of the comparator turns on and thereby when the output of the flip-flop turns off and the storage capacitor stops integrating current. The photosensor is preferably connected to a positive input of the comparator. A voltage source that provides a reference voltage is preferably connected to a negative input of the comparator. When no current is flowing in the photosensor, voltage of the positive input is below the reference voltage. When light to which the photosensor is sensitive is incident on the photosensor with sufficient intensity, current from the photosensor raises the voltage of the positive input above the reference voltage. The crossing of the photosensor input voltage from below to above the reference voltage turns on the output of the comparator. This in turn, turns off the output of the flip-flop and stops current flowing into the storage capacitor from the current source.

Variations of the above noted connections between the photosensor, voltage source and comparator are possible. For example, the reference voltage can be negative as well as positive and the flip-flop can be turned off when voltage of the photosensor input crosses from above to below a reference voltage. Such variations will occur to persons of the art and can be advantageous.

Start and stop times of the pixel are respectively, the time at which the flip-flop turns on and the storage capacitor starts integrating current and the time that the flip-flop turns off and the storage capacitor stops integrating current. The charge accumulated by the storage capacitor between the start and stop times is a function of the time lapse between the start and stop times. The charge accumulated on the storage capacitor is sensed and registered using methods known in the art and then used to determine the time lapse.

In a 3D camera that uses a time of flight technique to measure distances to an object, in accordance with a preferred embodiment of the present invention, elapsed time between a start time and a stop time of a pixel is used to measure the time it takes a pulse of light to travel from a light source to the object and back to the pixel.

In a 3 D camera that uses a triangulation technique to measure distances to an object, in accordance with a preferred embodiment of the present invention, elapsed time between a start time and a stop time of a pixel indicates the position of a light beam that illuminates the object from which light is reflected by the object to the pixel.

In some photosurfaces, in accordance with preferred embodiments of the present invention, both the start times and the stop times of the pixel circuit are controlled by light incident on the pixel. In a photosurface of this type, in accordance with a preferred embodiment of the present invention, a pixel circuit comprises a photosensor connected to a first input of a comparator. A second input of the comparator is connected to a voltage source that maintains the second input at a reference voltage. When light of having intensity greater than a certain threshold intensity is incident on the photosensor, voltage on the positive input of the comparator rises above the reference voltage and the pixel circuit is gated on. When the intensity of the light drops below the threshold intensity, the pixel circuit is gated off. In some preferred embodiments of the present invention, a 3D camera that incorporates a photosurface of this type is used to measure distances to an object using triangulation.

Preferably, the pixels are packed on the photosensitive surface with a pitch less than 50 microns. More preferably the pixels are packed with a pitch less than 30 microns. Preferably, the photosurface is produced using CMOS technology. Using CMOS technology, light sensitive photosurfaces comprising arrays of pixels suitable for visual imaging can be produced, wherein each pixel of the photosurface contains a pixel circuit having a photosensor, such as a photo-diode, and electronic switching, control and logic elements. For example, U.S. Pat. No. 5,345,266 describes a pixel comprising a photodiode and a transistor. Peter Denyer in a talk given at the 1996 SSCTC Workshop On CMOS Imaging Technology, Feb. 7, 1996, described a pixel comprising electronic elements that is on the order of 12 microns on a side and in which the photodiode occupies 60% the pixel area. In some preferred embodiments of the present invention pixel circuits are formed as elements of a monolithic multilayer circuit in which switching control and/or logic components of the pixel circuits are in levels of the monolithic circuit below a surface level on which the photosensors are located.

There is thus provided, in accordance with a preferred embodiment of the present invention a semiconductor surface comprising a plurality of light sensitive pixels, wherein each pixel of the plurality of pixels comprises an electronic circuit formed on or in the semiconductor surface, the circuit comprising: a photosensor that generates a signal responsive to light incident thereon at an output thereof; and circuitry that provides a signal responsive to a time lapse between a first time responsive to the signal and a reference time.

Preferably, the circuitry comprises a current integrator that integrates a current during the time lapse. Preferably, the current integrator comprises a capacitor.

Alternatively or additionally, the circuitry comprises a switchable source having on and off states, wherein when the switchable source is in the on state the integrator integrates current and wherein when the switchable source is in the off state the integrator does not integrate current.

Preferably, the circuitry comprises a comparator having an output connected to an input of the switchable source, the photosensor output being connected to an input of the comparator such that when light incident on the photosensor has an intensity greater than a predetermined intensity the switchable source changes states.

Alternatively or additionally, the circuitry preferably switches the switchable source to the off state, at the first time, responsive to the signal from the photosensor.

Alternatively, the circuitry switches the switchable source to the on state, at the first time, responsive to the signal from the photosensor.

In some preferred embodiments of the present invention the switchable source is a flip-flop.

In some preferred embodiments of the present invention the circuit is formed as a monolithic integrated circuit.

There is further provide a 3D camera comprising a semiconductor surface according to any preferred embodiment of the present invention.

According to some preferred embodiments of the present invention the 3D camera comprises: a light source that illuminates objects in a scene imaged with the 3D camera with at least one light pulse; wherein for each pixel of the plurality of pixels the reference time is a time at which the at least one light pulse is radiated and the first time is a time at which light from the at least one light pulse reflected by a surface region of the objects is incident on the pixel, and including circuitry that computes the distance between the pixel and the surface region responsive to the time lapse.

According to some preferred embodiments of the present invention the 3D camera comprises a fan beam wherein the position of the fan beam is defined by a scan angle. Preferably, the fan beam illuminates an object at a plurality of different scan angles and the photosensor signals are generated responsive to light reflected by the object from the fan beam to the photosensors and wherein the fan beam moves between scan angles at a rate so that differences between the first times for different pixels illuminated with reflected light from the fan beam at different scan angles are greater than a given time difference and differences between the first times for different pixels illuminated with reflected light from the fan beam at the same scan angle are less than the given time difference.

Preferably, the time at which the fan beam illuminates the object at each of the plurality of scan angles is known.

Alternatively or additionally, the 3D camera preferably comprises a reflector that reflects light to at least one pixel in the semiconductor surface for each of the scan angles and wherein for a given scan angle differences between the first time for the at least one pixel and the first times for pixels illuminated by light from the fan beam reflected by the object are less than the given time difference. Preferably, the 3D camera comprises circuitry that determines the given scan angle from the location of the at least one pixel.

According to some preferred embodiments of the present invention, the reference time is the same for all pixels of the plurality of the pixels.

According to other preferred embodiments of the present invention, the reference time is different for at least two pixels of the plurality of pixels.

There is further provided, in accordance with a preferred embodiment of the present invention, a 3D camera for measuring distances to points on an object comprising: a semiconductor surface comprising a plurality of light sensitive pixels wherein each pixel comprises a circuit having a photosensor, a switch and an output terminal, wherein the circuit provides a signal on the output terminal only when light is incident on the photosensor and the switch is closed; and a fan beam that illuminates the object for at least one position of the fan beam so that light from the fan beam is reflected by the object to at least one of the pixels, wherein for each position of the fan beam, a plurality of the switches are closed simultaneously.

Preferably the circuits are formed in or on the semiconductor surface. Alternatively or additionally, the circuits are preferably formed as elements of a monolithic integrated circuit.

Alternatively or additionally, the 3D camera comprises signal receiving circuitry having a plurality of inputs and wherein pixels for which the switches are simultaneously closed have the output terminals connected to different inputs of the signal receiving circuitry. Preferably, the plurality of pixels comprises an array of pixels having rows and columns of pixels, wherein each pixel belongs to one row and one column of the array. Preferably, the output terminals of pixels in a same column of pixels are connected to a same input of the encoder.

Preferably, the switches of all pixels in a same row of pixels are simultaneously closed.

Preferably, the switches of pixels in the semiconductor surface are sequentially closed, row by row.

Alternatively or additionally, rows of the semiconductor surface are parallel to the plane of the fan beam for all positions of the fan beam at which the fan beam illuminates the object.

According to some preferred embodiments of the present invention, an output of the photosensor is connected to a contact terminal of the switch.

According to some preferred embodiments of the present invention the circuit comprises a comparator having an input connected to the photosensor wherein, when light having an intensity greater than a predetermined intensity is incident on the photosensor, a signal is generated on an output of the comparator. Preferably, the output of the comparator is connected to a contact terminal of the switch.

According to some preferred embodiments of the present invention the signal receiving circuitry comprises an encoder.

There is further provided, in accordance with a preferred embodiment of the present invention a method of measuring distances to regions on an object comprising: providing a semiconductor surface having a first plurality of light sensitive pixels; illuminating the object with light from a fan beam of light having a position defined by a scan angle; sensing signals from pixels on the semiconductor surface that are illuminated with light reflected from the fan beam by the object by simultaneously interrogating a second plurality of pixels comprised in the first plurality of pixels; determining a scan angle for pixels that provide signals; using locations of pixels that provide signals and the determined scan angles to determine distances to regions of the object.

Preferably, the first plurality of pixels are arranged in a rectangular array of rows and columns pixels. Preferably, all pixels in a row of pixels are interrogated simultaneously. Pixels in the first plurality of pixels are preferably interrogated sequentially, row by row.

Additionally or alternatively the method comprises providing a signal sensing means and wherein sensing signals comprises sensing signals from all pixels in a column of pixels on a same input of the sensing means.

The invention will be more clearly understood by reference to the following description of preferred embodiments thereof read in conjunction with the figures attached hereto. In the figures identical structures, elements or parts which appear in more than one figure are labeled with the same numeral in all the figures in which they appear. The figures are listed below and:

DETAILED DESCRIPTION OF PREFERRED EMBODIMENTS

Figures 1A, 1B:
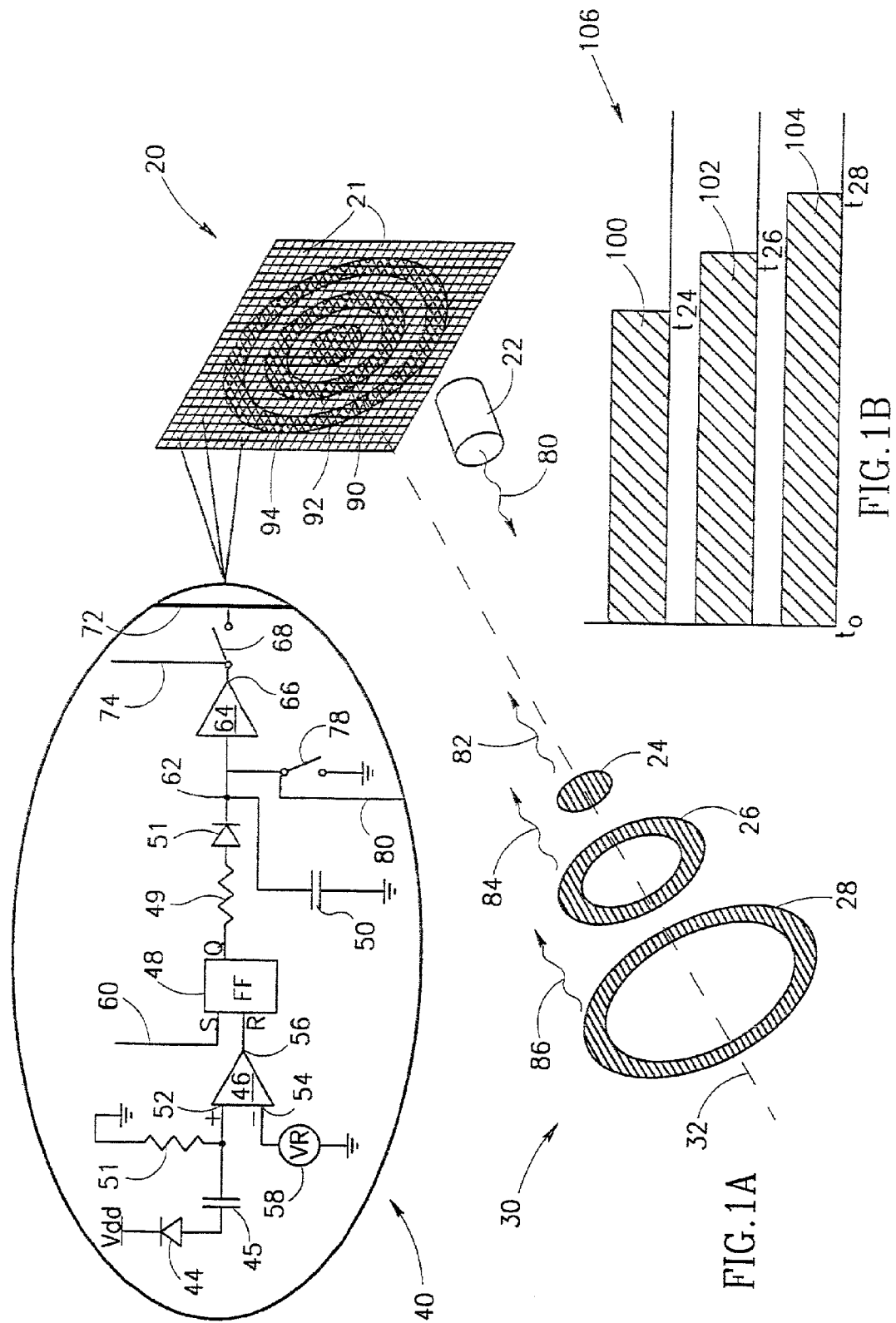
FIGS. 1A and 1B show a schematic of a self triggering photosurface and a circuit diagram of its pixels and schematically illustrates how the photosurface is used to determine distances to objects in a scene using time of flight, in accordance with a preferred embodiment of the present invention.

FIG. 1A schematically shows a photosurface 20, in accordance with a preferred embodiment of the present invention. Photosurface 20 comprises pixels 21, each of which preferably has a pixel circuit 40 shown schematically and greatly magnified. The operation of circuit 40 is controlled and monitored by an appropriate controller (not shown).

Photosurface 20 is shown in FIG. 1A being used with a pulsed laser 22 to determine distances to objects 24, 26 and 28 in a scene 30, in accordance with a preferred embodiment of the present invention. Photosurface 20 and laser 22 are parts of a 3D camera that operates as a range finding "time of flight" camera, in accordance with a preferred embodiment of the present invention. Only the parts of the 3D camera that are relevant to the discussion are shown. Preferably, photosurface 20 is appropriately shielded by a filter (not shown) that transmits substantially only light having a wavelength the same as a wavelength of light radiated by laser 22.

Figure 3:
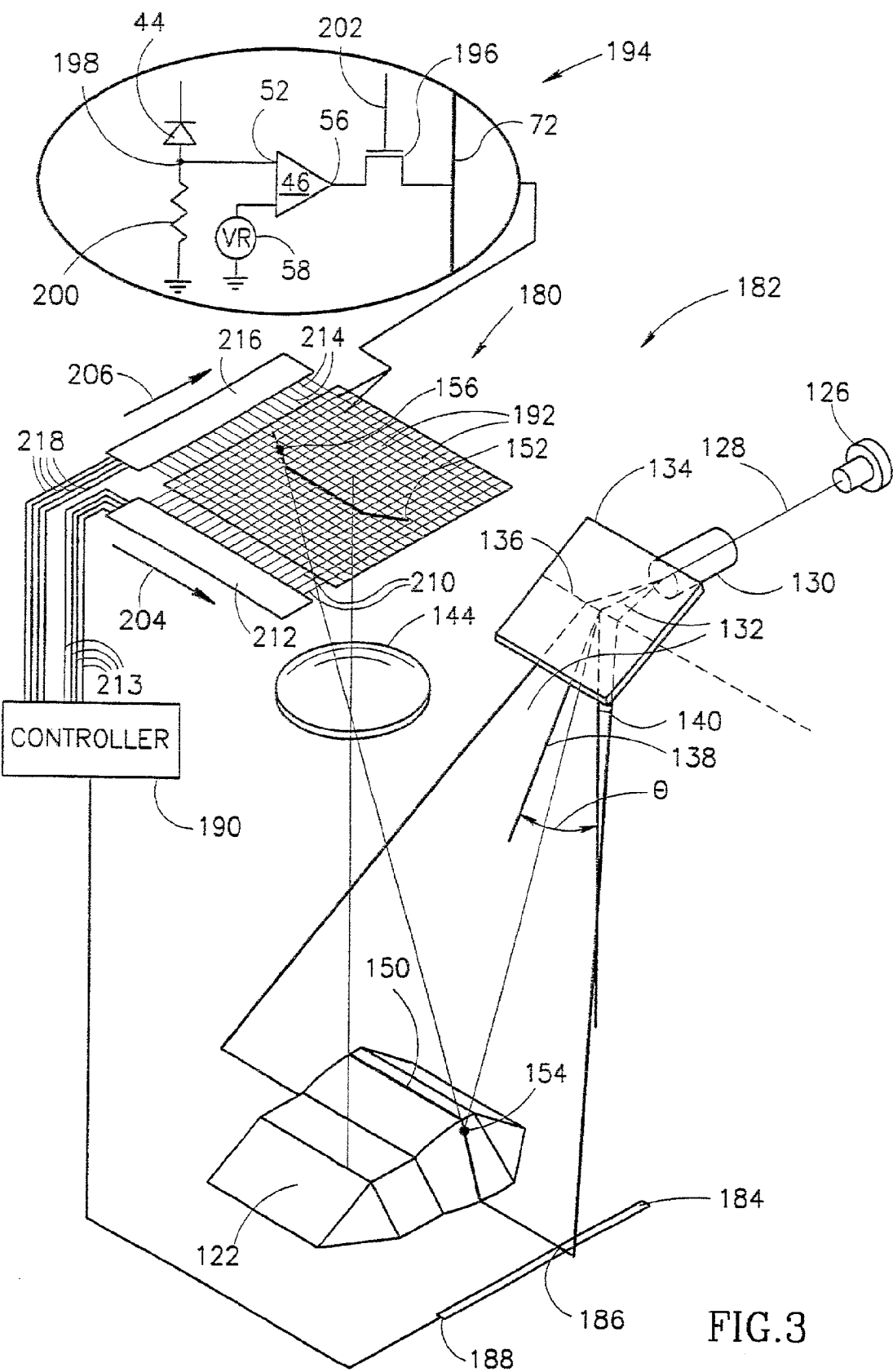
FIG. 3 schematically shows a different photosurface and a 3D camera for imaging an object using triangulation, in accordance with a preferred embodiment of the present invention.

For ease and clarity of presentation, elements in FIG. 3 are not shown to scale and for simplicity of exposition each of objects 24, 26 and 28 in scene 30 are planar and rotationally symmetric about the optic axis 32 of the 3D camera. All regions of an object 24, 26 or 28 are equidistant from photosurface 20. Each of objects 24, 26 and 28 is located at a different distance from photosurface 20.

The 3D camera measures distance to objects 24, 26 and 28 that are imaged on photosurface 20 by determining how long it takes light pulses to travel from laser 22 to each of objects 24, 26 and 28 and back to photosurface 20. However, the invention is applicable to measurement of more complicated surfaces Pixel circuit 40 preferably comprises a photosensor 44, preferably back biased with a voltage $V_{dd}$, a comparator 46, a flip-flop 48 and a storage capacitor 50. Photosensor 44 is preferably capacitively coupled with a capacitor 45 to a positive input 52 of comparator 46. Capacitive coupling eliminates DC input to input 52 which is typically generated by relatively constant background light. A voltage source 58 is preferably connected to a negative input 54 of comparator 46 and maintains input 54 at a desired reference voltage $V_R$. Preferably, input 52 is connected to ground through a bleeding resistor 51 having appropriate resistance. Output 56 of comparator 46 is connected to a reset input "R" of flip-flop 48 and a flip-flop control line 60 connects a set input "S" of flip-flop 48 to the controller. An output Q of flip-flop 48 is connected in series with a current limiting resistor 49 and a diode 51 to storage capacitor 50 at a node 62. Node 62 is connected to a buffer amplifier 64 having an output 66 connected via an address switch 68 to a readout buss 72. Address switch 68 is controlled by the controller, to which it is connected via address control line 74. A reset switch 78, when closed, discharges any charge accumulated on storage capacitor 50. Reset switch 78 is closed and opened by signals from the controller transmitted over a reset control line 80.

When output Q of flip-flop 48 is on, current flows from output Q into capacitor 50 and charge accumulates on capacitor 50 at a rate determined substantially by the resistance of limiting resistor 49 and the capacitance of storage capacitor 50. When output Q is off, no current flows into capacitor 62 and diode 51 prevents accumulated charge on storage capacitor 50 from discharging back through flip-flop 48. Output Q of flip-flop 48 is turned on when set input S of flip-flop 48 receives a "set" signal from the controller. Output Q of flip-flop 48 is turned off when output 56 of comparator 46 turns on thereby sending a "reset" signal to input R of flip-flop 48.

Photocurrent in photosensor 44 controls when output 56 of comparator 46 turns on. As long as there is substantially no photocurrent in photosensor 44, or photocurrent in photosensor 44 is below a certain threshold current, voltage at input 52 is below $V_R$ and output 56 of comparator 46 is off. If light to which photosensor 44 is sensitive is incident on photosensor 44 with sufficient intensity to generate a photocurrent in photosensor 44 that is above the threshold current, the voltage at input 52 exceeds $V_R$ and comparator output 56 is on.

Charge is accumulated on storage capacitor 50 beginning from a start time at which output Q of flip-flop 48 is turned on by a set signal from the controller. Charge stops accumulating on storage capacitor 50 at a stop time at which output Q of flip flop 48 is turned off by a reset signal from output 56 of comparator 46, which reset signal is generated when light of sufficient intensity is incident on photosensor 44. Charge accumulated on storage capacitor 50 is therefore a function of the time lapse between the start time and the stop time.

Preferably, the controller operates all flip-flops 48 of pixels 21 in photosurface 20 so that all flip-flops 48 turn on together. In some preferred embodiments of the present invention this is achieved by connecting all flip-flop control lines 60 together so that a single set signal from the controller turns all flip-flops 48 on. In other preferred embodiments of the present invention, pixels 21 are grouped into pixel groups. Flip-flop control lines 60 to all flip-flops 48 in a same pixel group are connected together and a single set signal to a pixel group from the controller turns on all pixels 21 in the croup substantially simultaneously. Set signals are sent to different pixel groups with appropriate delays so that pixel groups at different distances from the controller receive set signals at substantially the same time.

To measure distances to objects 24, 26 and 28, at a time t=0, after storage capacitors 50 of pixels 21 have been reset by closing and opening reset switch 78, laser 22 radiates a light pulse, represented by wavy arrow 80, to illuminate scene 30. At the same time a set signal, or signals, (depending upon the way flip-flop control lines 60 are wired) from the controller to set inputs S of flip-flops 48 turns on flip-flop outputs Q of, preferably, all pixels 21. As a result, storage capacitors 50 of all pixels 21 in photosurface 20 begin charging from currents flowing from their respective flip-flops 48 at substantially the same time t=0.

Each of objects 24, 26 and 28 reflects light from radiated light pulse 80 towards photosurface 20 in reflected light pulses represented by wavy arrows 82, 84 and 86 respectively. Reflected light pulses 82, 84 and 86 are focused by collecting optics (not shown) so as to form images 90, 92 and 94 respectively of objects 24, 26 and 28 on photosurface 20.

Image 90 of object 24 is formed at a time $t_{24}=D_{24}/c$ where $D_{24}$ is the sum of the distance from light source 22 to object 24 and the distance from object 22 to photosurface 20 and c is the speed of light. At time $t_{24}$, light from reflected light pulse 82 is incident on each photosensor 44 in a pixel 21 covered by image 90. In photosensor 44 of each of pixels 21 in image 90, the incident light generates a photocurrent that causes input 52 of comparator 46 of the pixel to rise above reference voltage $V_R$. As a result, output 56 of comparator 46 turns on and generates a reset signal at reset input R that turns output Q of flip-flop 48 off and stops current from flowing into storage capacitor 50 of the pixel. Thus, at time $t_{24}$, capacitors 50 in all pixels 21 in image 90 stop charging and the amount of charge accumulated on each storage capacitor 50 of pixels 21 is a function of $t_{24}$. The charge on each capacitor 50 of pixels 21 in image 90 can therefore be used, in accordance with a preferred embodiment of the present invention, to measure the distance to object 24.

Similarly, image 92 of object 26 is formed at a time $t_{26}=D_{26}/c$ and image 94 is formed at a time $t_{28}=D_{28}/c$ where $D_{26}$ and $D_{28}$ are the distances of objects 26 and 28 respectively from photosurface 20. Charges on storage capacitors in pixels 21 covered by images 92 and 94 are functions of $t_{26}$ and $t_{28}$ respectively and can be used to determine the distances to each of objects 26 and 28.

The lengths of time during which storage capacitors 50 of pixels 21 in images 90, 92 and 94 integrate current from their respective flip-flops 48 are shown schematically in FIG. 1B by the length of bars 100, 102 and 104 respectively shown in a bar graph 106. Bars 100, 102 and 104 are shown extending from time t=0 to times t24, t26 and t28 respectively.

Following exposure of photosurface 20 to reflected light pulses 82, 84 and 86, the amount of charge on storage capacitor 50 of each pixel 21 is read out. This is accomplished by turning on address switch 68 of the pixel and sensing and registering the charge deposited on readout buss 72 by buffer amplifier 64 of the pixel. The sensed charge is processed using methods known in the art to determine the time when storage capacitor 50 of the pixel 21 stopped charging and the distance from the pixel of the object imaged on the pixel.

In some preferred embodiments of the present invention a train of light pulses 80 is radiated to illuminate objects 24, 26 and 28. A frame of photosurface 20 is grabbed and charges on storage capacitors 50 read following the last light pulse 80 in the train of light pulses. Storage capacitors 50 of all pixels 21 are reset at the beginning of the train of pulses 80 and subsequently, at the time that each pulse 80 of the train of pulses is radiated, a set signal is transmitted to all flip flops 48. The charges on storage capacitors 50 that are used to determine distances to objects 24, 26 and 28 are the sums of charges accumulated for each pulse 80 in the train of light pulses. By using a train of light pulses instead of a single light pulse, random error in distance measurements to objects 24, 26 and 28 are reduced.

In some preferred embodiments of the present invention, in order to determine if background light triggers comparator 46, photosurface 20 is exposed to scene 30 without illuminating scene 30 with light from laser 22. In the event that background illumination triggers comparator 46, the magnitude of reference voltage VR is adjusted accordingly.

Figure 2:
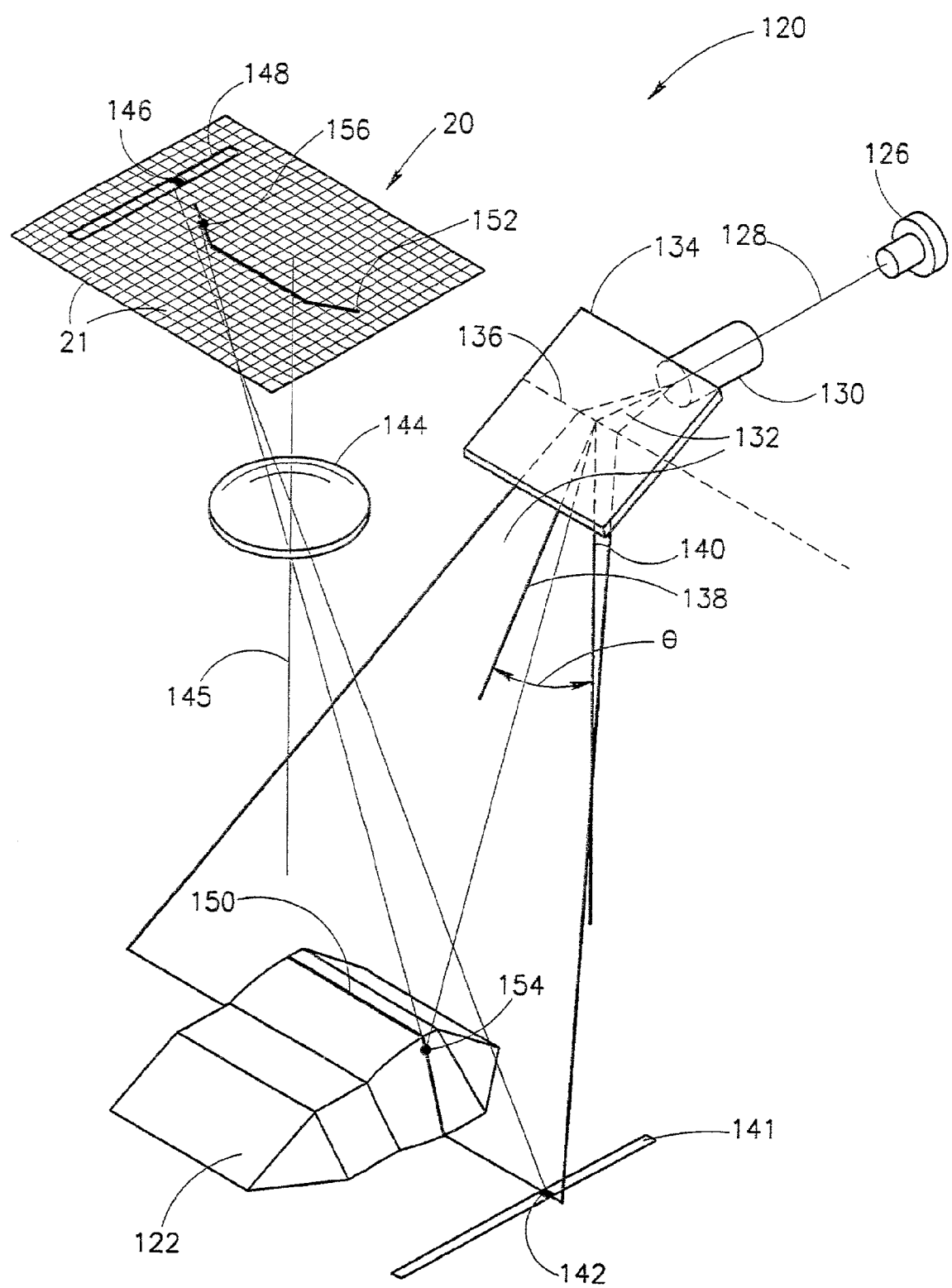
FIG. 2 schematically shows a 3D camera, comprising the same self triggering photosurface shown in FIG. 1A, that is used to determine distances to an object using triangulation, in accordance with a preferred embodiment of the present invention.

FIG. 2 shows a schematic of a 3D triangulation camera system 120 comprising photosurface 20 shown in FIG. 1A, in accordance with a preferred embodiment of the present invention. 3D camera 120 is shown imaging an object 122 in order to determine distances to points on object 122, in accordance with a preferred embodiment of the present invention. Only parts of the 3D camera that are relevant to the discussion are shown and sizes of the parts and other elements shown in FIG. 2 are not necessarily to scale but have been chosen for ease and clarity of presentation.

3D camera 120 comprises a laser 126 that emits a beam 128 of laser light that enters a transmission optics module 130. Transmission optics module 130 collimates and expands beam 128 to form a thin fan beam 132 of laser light. Fan beam 132 is incident on a scanning mirror 134 along a line 136. Scanning mirror 134 reflects fan beam 132 at a scan angle $\theta$, which is measured between a central ray 138, of fan beam 132 and a line 140. Line 140 is preferably perpendicular to both line 136 and the direction of beam 128. Scan angle $\theta$ is preferably changed by rotating scanning mirror 134 about an axis coincident with line 136. This type of structure is commonly used in triangulation type 3D systems. (In some systems a polygonal scanner is used in place of scanning mirror 134 to change scan angle $\theta$).

For each scan angle $\theta$, fan beam 132 illuminates a thin "object" stripe 150 on the surface of object 122. Light from fan beam 132 that object stripe 150 reflects is collected by an appropriate lens system, represented schematically by a lens 144, that focuses the collected light onto pixels 21 of photosurface 20 to form an object stripe image 152 on photosurface 20. Lens 144 has an optic axis 145. Preferably, optic axis 145 of lens 144, the direction of beam 128, central ray 138 and line 140 are coplanar.

Light from fan beam 132 that is reflected from a small region 154 of stripe 150 on object 122 is focused by lens 144 to a corresponding region 156 on object stripe image 152. If the magnitude of scan angle $\theta$ is known, three spatial coordinates for region 154 with respect to a convenient coordinate system can be determined from the location of region 156 on photosurface 20, using geometric analysis methods known in the art. The three coordinates locate region 154 in space with respect to photosurface 20 and determine the distance of region 154 from photosurface 20 and the location of region 154 on object 122. The equations that define the three coordinates as functions of scan angle $\theta$ and the relative positions of elements of 3D camera 120 are discussed in PCT application PCT/IL97/00370 referenced above.

In order to determine the scan angle $\theta$ for a given object stripe image 150, in accordance with a preferred embodiment of the present invention, 3D camera 122 comprises a position reflector 141. Points on position reflector 141 are imaged by lens 144 with the light that they reflect onto pixels 21 that lie in a band 148 of pixels 21 on photosurface 20, i.e. the image of position reflector 141 on photosurface 20 is band 148.

At a given scan angle $\theta$, fan beam 132 illuminates position reflector 141 along a thin "position" stripe 142. Light from fan beam 132 reflected from position stripe 142 is focused by lens 144 to form a position stripe image 146 that lies in band 148. The location of position stripe image 146 along band 148 is a function of fan angle $\theta$.

Position reflector 141, is accurately positioned with respect to line 136, lens 144 and photosurface 20. From the known position of these elements the magnitude of scan angle $\theta$ can be determined from the location of region 146 on photosurface 20.

To measure distances to regions of object 122, in accordance with a preferred embodiment of the present invention, at a time t=0 pixels 21 of photosurface 20 are reset and then gated on. Storage capacitors 50 in pixels 21 begin integrating current from their respective flip-flops. Object 122 is then illuminated at a plurality of different scan angles θ. For each scan angle θ at which object 122 is illuminated by fan beam 132, an object stripe image 152 and a position stripe image 146 corresponding to the scan angle θ are formed on photosurface 20. When the light that forms the object stripe image 152 and the position stripe image 146 is incident on photosurface 20, photocurrent is generated in photosensors 44 in pixels 21 that lie in the images. As a result, pixels 21 in the images are gated off and capacitors 50 in pixels 21 in the object stripe image 152 and the position stripe image 146 stop integrating current.

However, because of differences in path lengths from the source of fan beam 132 to pixels 21 in photosurface 20 for different points on object stripe 150 and position stripe image 146, pixels 21 in the object stripe image 152 and the position stripe image 146 are gated off at slightly different times, hereinafter referred to as "stop times". However, differences in path lengths lead to differences in stop times that are equal to differences in path lengths divided by the speed of light. These time differences are generally very small compared to the time, hereinafter referred to as a "shift time", that it takes to change the scan angle from one to another of the scan angles at which fan beam 132 illuminates object 122. Furthermore, the maximum difference between stop times for pixels 21 in an object image stripe 152 and a position stripe image 146 corresponding to a same scan angle can be decreased relative to the shift time by reducing the speed at which scan beam 132 is moved from one scan angle to the next scan angle. Therefore, differences in stop times for pixels 21 in an object stripe image 152 and a position stripe image 146 corresponding to a same scan angle are relatively small. On the other hand differences between stop times for pixels 21 in an object stripe image 152 and a position stripe image 146 corresponding to different scan angles are relatively large.

As a result, differences between voltages to which storage capacitors 50 are charged in an object stripe image 152 and a position stripe image 146 corresponding to a same scan angle are small compared to differences between voltages to which storage capacitors 50 are charged in an object stripe image 152 and a position stripe image 146 corresponding to different scan angles. Pixels 21 belonging to a same scan angle can be distinguished from pixels 21 belonging to different scan angles by the voltage to which their respective storage capacitors 50 are charged.

Pixels 21 in object stripe images 152 and position stripe images 146 are in effect time stamped with the time that they were created, with the time stamp of a pixel 21 being registered in the voltage of the pixel's storage capacitor 50. Pixels 21 belonging to the same scan angle θ bear the same time stamp (to within a maximum difference in stop times for pixels that are illuminated at the same scan angle) while pixels 21 belonging to different scan angels θ bear different time stamps.

Following illumination of object 122 at different scan angles θ a frame of photosurface 20 is grabbed by reading out the voltages of storage capacitors 50. Therefore, when the image frame data is processed all pixels 21 that were illuminated with fan beam 132 at a same scan angle θ can be identified by the charge accumulated on their respective storage capacitors 50, i.e. by their respective time stamps.

For each pixel 21 in an object stripe image 152 there is at least one pixel 21 in a position stripe image 146 bearing the same time stamp. Therefore since the scan angle θ for a pixel 21 in a position stripe image 146 is known, the scan angle for each pixel 21 read in the frame is known. As a result, the location in space of each region 154 of object 122 imaged on a pixel 21, the distance of the region 154 from photosurface 20 and its location on object 122, can be determined, in accordance with a preferred embodiment of the present invention.

FIG. 3 schematically shows a photosurface 180 comprised in a 3D camera 182, in accordance with a preferred embodiment of the present invention. 3D camera 182 uses triangulation to determine distances to an object and is shown in FIG. 3 imaging object 122. 3D camera 182 is preferably identical to 3D camera 120 shown in FIG. 2 except that photosurface 180 replaces photosurface 20 of 3D camera 120 and position reflector 141 is preferably replaced by a position sensing device, "PSD" 184.

PSD 184 is accurately positioned with respect to the other elements of 3D camera 182, so that for each different scan angle θ, fan beam 28 illuminates PSD 184 along a thin stripe 186 that is located at a different position along PSD 184. PSD 184 has an output 188 that is connected to a controller 190 and transmits information to controller 190 corresponding to the position of thin stripe 186 on PSD 184. From the transmitted information, controller 190 preferably determines the scan angle θ of fan beam 28.

Photosurface 180 comprises pixels 192, each of which preferably has a pixel circuit 194 shown schematically and greatly magnified. Preferably, photosurface 180 is shielded with a filter (not shown) that transmits substantially only light having a wavelength that is the same as a wavelength of light radiated by laser 126.

Pixel circuit 194 comprises a photosensor 44 preferably back biased with a voltage Vdd, a comparator 46 and an address switch 196. Photosensor 44 is preferably connected at a node 198 to a positive input 52 of comparator 46 and a bleeding resistor 200 that is preferably connected to ground. A negative input 54 of comparator 46 is connected to a voltage source 58 that maintains negative input 54 at an appropriate reference voltage VR. An output 56 of comparator 46 is connected to address switch 196. When address switch 196 is closed, output 56 of comparator 46, is connected to a read out buss 72.

When light to which photosensor 44 is sensitive is incident on photosensor 44 with sufficient intensity, a photocurrent is generated in photosensor 44 that drives input 52 of comparator 46 above reference voltage VR. In response, comparator 46 generates an appropriate predetermined voltage, hereinafter referred to as a "signal voltage", on output 56 and maintains the signal voltage on output 56 as long as voltage on input 52 remains above the reference voltage VR. If address switch 196 is closed when there is a signal voltage on output 56, the signal voltage is transmitted to readout buss 72. Address switch 196 is controlled by signals that it receives over a switch control line 202. A pixel 192 is said to be "on" when voltage on output 56 of comparator 46 in the pixel is at the signal voltage.

Assume that pixels 192 in photosurface 180 are located by row and column indices i and j respectively and that the particular pixel 192 in the i-th row and j-th column of pixel surface 180 is represented by P(i,j). The direction of increasing row index i and column index j are indicated by arrows 204 and 206 respectively. Photosurface 180 is oriented, in accordance with a preferred embodiment of the present invention, so that columns of pixels 192 are substantially parallel to the plane of fan beam 28.

Switch control lines 202 of all pixels in a same row of pixels 192 in photosurface 180, in accordance with a preferred embodiment of the present invention, are connected to a common "row" select line 210. Switch control lines 202 of pixels 192 in different rows are preferably connected to different row select lines. Row select lines 210 are preferably connected to a row selector 212. Appropriate control signals from row selector 212 transmitted on a particular row select line 210 control all address switches 196 connected to the row select line 210 to open or close simultaneously. Row selector 212 is preferably connected to controller 190 by control lines 213. Controller 190 transmits signals over control lines 213 that control the signals that row selector 212 transmits and determine over which row select lines the signals from 212 are transmitted. The particular row select line for the i-th row is represented by "RC(i)".

Read out busses 72 of all pixels 192 in a same column of pixels 192 in photosurface 180 are connected to a common "column" signal line 214, in accordance with a preferred embodiment of the present invention. Read out busses 72 of pixels 192 in different columns are connected to different column signal lines 214. Each column signal line 214 is input to an encoder 216 that has outputs 218. Outputs 218 are connected to controller 190. Encoder 216 has a sufficient number of outputs 218 so that signals on outputs 218 are useable by controller 190 to identify over which signal line 214 a signal reaches encoder 216 as long as signals reaching encoder 216 are sufficiently separated in time so that they do not overlap. The particular column signal line 214 to which readout buses 72 of pixels 192 in the j-th column are connected is represented by "CS(j)".

In some preferred embodiments of the present invention, encoder 216 is designed to send an appropriate signal to controller 190 if more than one signal is input to encoder 190 simultaneously. This can be done, for example, by using pulse height discrimination techniques known in the art to determine if more than one signal is received by encoder 216. In some preferred embodiments of the present invention, encoder 216 and/or controller 190 are designed to determine an average column index from column indices of column signal lines 214 from which signals are received simultaneously. The average column index is used as the column index for the received signals.

In other preferred embodiments of the present invention, encoder 216 is designed so that signals sent to encoder 216 simultaneously over column signal lines 214 that are within a certain limited distance of each other are delayed with respect to each other so that no two signals arrive at the encoder simultaneously. In other preferred embodiments of the present invention a plurality of encoders are used to prevent ambiguity in determining over which column signal lines simultaneous signals arrive. For example, in accordance with a preferred embodiment of the present invention, two encoders are used. One encoder is connected to "even" column signal lines 214 and the other is connected to "odd" column signal lines 214 (i.e. column signal lines CS(j) for which j is even and odd respectively). As a result simultaneous signals from two adjacent column signal lines are routed to different encoders and can therefore be distinguished. Three or more encoders are similarly useable to receive signals from column signal lines 214, in accordance with preferred embodiments of the present invention. When using "n" encoders, in accordance with a preferred embodiment of the present invention, preferably, each of any group of n consecutive column signal lines 214 in photosurface 180 is connected to a different one of the n encoders.

Assume that at a particular moment, light is incident with sufficient intensity on photosensor 44 of pixel P(i,j) to trigger comparator 46 of pixel P(i,j) and thereby to turn on the pixel. As a result, there is a signal voltage on output 56 of comparator 46 of pixel P(i,j). Assume further that during the time that output 56 of pixel P(ij) has the signal voltage, controller 190 controls row selector 212 to transmit a control signal on row control line RC(i) that closes all address switches 196 in pixels P(i,j) located in row i, while leaving address switches 196 open in all other pixels 192. Then pixel P(i,j) will transmit the signal voltage to encoder 216 over column signal line CS(j). In response, if pixel P(i,j) is the only "on" pixel in row i, encoder 216 receives an input from only one column signal line 214 and will therefore generate signals on its outputs 218 that properly identify to controller 190 that the signal it received came from the particular column signal line CS(j). Since controller 190 has closed only address switches 196 in row i, controller 190 correctly determines that pixel P(i,j) is on.

To determine distances to object 122, fan beam 28 is controlled by controller 190 to illuminate object 122 at a plurality of different scan angles θ. At each scan angle θ, light from fan beam 28 illuminates an object stripe 150 on the surface of object 122. Object+stripe 150 is imaged with light that object stripe 150 reflects from fan beam 28 along an image stripe 152 of pixels 192 in photosurface 180. As long as object stripe 150 is illuminated by fan beam 28, outputs 56 of comparators 46 for pixels 192 in image stripe 152 are maintained at the signal voltage and pixels 192 in image stripe 152 are on.

Fan beam 28 is preferably very thin so that illuminated object stripe 150 is also thin and so that image stripe 152 is substantially only one or at most a few pixels 192 wide. For simplicity of presentation it is assumed that image stripe 152 is only one pixel 192 wide.

For each scan angle θ controller 190 controls row selector 212 to close and open address switches 196 that are connected to each of row select lines 210, one row select line 210 at a time. When address switches 196 in a row i of pixels 192 are closed by an appropriate signal on row select line RS(i), the signal voltage from a pixel P(i,j) in image stripe 192 that is located on row i and column j (if there is a pixel 192 in image stripe 152 located at "i,j") transmits its signal voltage along the column signal line CS(j). Controller 190 registers the value of the indices i and j of the pixel P(i,j) and then controls row selector 212 to open address switches 196 in row i and close address switches 192 in a different row. The row and column indices of a pixel 192 in image stripe 152 that is located on the different row is then registered in the same way that the row and column indices of the pixel P(i,j) in image stripe 152 located in row i and column j is registered. The process continues until all rows are "read" and row and column indices corresponding to the locations of all pixels 192 in image stripe 152 for scan angle θ are registered by controller 190.

It is to be noted, that image stripe 152 is assumed to be one pixel wide and that pixel columns are parallel to the plane of fan beam 28, in accordance with a preferred embodiment of the present invention. Therefore, because address switches 196 are turned on by row rather than by column, in accordance with a preferred embodiment of the present invention, when each row is read, encoder 216 receives an input from only one column signal line 214 at a time.

For scan angle θ, in addition to a set of row and column indices for "on" pixels 192 in image stripe 152, controller 190 preferably receives and registers an output signal from PSD 184. The output signal from PSD 184 is preferably used to determine the scan angle θ to which the on pixel indices correspond. Distances to regions of object stripe 150 are then determined from the registered pixel indices and the scan angle θ.

In the claims and description of the present application, each of the verbs, "comprise" and "include", and conjugates thereof, are used to indicate that the object or objects of the verb include but are not necessarily a complete listing of all components, elements or parts of the subject or subjects of the verb.

The present invention has been described using non-limiting detailed descriptions of preferred embodiments thereof that are provided by way of example and are not intended to limit the scope of the invention. Variations of embodiments described will occur to persons of the art. For example, in the preferred embodiments described in FIGS. 1 and 2 reflected light from an object imaged is used to turn off flip-flops 48 in pixels 21 of photosurface 20. In variations of the described embodiments, light reflected from an imaged object can be used to turn on flip-flops 48. Flip-flops 48 are then subsequently turned off at a convenient time, such as the time at which a frame of photosurface 20 is taken. In the preferred embodiment described in FIG. 3, PSD 184 can be replaced with a reflector, as shown in FIG. 2. The scope of the invention is limited only by the following claims:

The invention claimed is:

1. A semiconductor surface comprising a plurality of light sensitive pixels, wherein each pixel of said plurality of pixels comprises an electronic circuit formed on or in said semiconductor surface, said circuit comprising:
   a photosensor that generates a signal responsive to light incident thereon at an output thereof;
   a current integrator;
   a switchable current source that can be turned on or off, which when on provides a predetermined current that flows into the integrator; and
   circuitry that turns the switchable current source on at a start time and subsequently turns the source off at a stop time and generates a signal responsive to current from the current source that is integrated by the integrator between the start and stop times and wherein one of the start time and stop time is determined responsive to a signal generated by the photosensor.

2. A semiconductor surface according to claim 1 wherein said current integrator comprises a capacitor.

3. A semiconductor surface according to claim 1 wherein the circuitry comprises a comparator having an input connected to the output of the photosensor and an output connected to an input of the switchable current source, wherein when light incident on the photosensor has an intensity greater than a predetermined intensity, the output signal from the photosensor switches the switchable current source between on and off.

4. A semiconductor surface according to claim 1 wherein the switchable current source comprises a flip-flop.

5. A semiconductor surface according to claim 1 wherein the circuit is formed as a monolithic integrated circuit.

6. A semiconductor surface according to claim 1 wherein the circuitry switches the switchable current source to on at the start time responsive to the signal from the photosensor.

7. A semiconductor surface according to claim 1 wherein the circuitry switches the switchable current source to off at the stop time responsive to the signal from the photosensor.

8. A 3D camera comprising a semiconductor surface according claim 1.

9. A 3D camera comprising:
   a semiconductor surface according to claim 8;
   a light source that illuminates objects in a scene imaged with said 3D camera with at least one light pulse;
   wherein for each pixel of said plurality of pixels said start time is a time at which said at least one light pulse is radiated and said stop time is a time at which light from said at least one light pulse reflected by a surface region of said objects is incident on said pixel,
   and including circuitry that computes a distance between said pixel and said surface region responsive to the time lapse between the start and stop times.

10. A 3D camera comprising:
    a semiconductor surface according to claim 8;
    a light source controllable to illuminate an object with light from a fan beam at known times, wherein position of the fan beam is defined by a scan angle and for different known times the scan angle is known and different; wherein said start time for said plurality of pixels is a time prior to illumination of the object by the fan beam and wherein for each scan angle light reflected from the fan beam by a region of the object is incident on a pixel of the plurality of pixels and said stop time for the pixel is a time at which reflected light is incident on the pixel; and
    including circuitry that determines from the signal responsive to the current integrated between the start and stop times and the known times, a scan angle for the fan beam from which the pixel is illuminated and uses the scan angle and position of the pixel in the semiconductor surface to determine by triangulation a distance of the region from the pixel.

11. A 3D camera according to claim 10 wherein said fan beam moves between scan angles at a rate so that differences between said stop times for different pixels illuminated with reflected light from said fan beam at different scan angles are greater than a given time difference and differences between said stop times for different pixels illuminated with reflected light from said fan beam at the same scan angle are less than the given time difference.

12. A 3D camera according to claim 11 comprising a reflector that reflects light to at least one pixel in said semiconductor surface for each of said scan angles and wherein for a given scan angle, differences between said stop time for said at least one pixel and said stop times for pixels illuminated by light from said fan beam reflected by said object are less than said given time difference.

13. A 3D camera according to claim 12 and including circuitry that determines said given scan angle from the location of said at least one pixel.

14. A 3D camera for measuring distances to points on an object comprising:
    a semiconductor surface comprising a plurality of light sensitive pixels wherein each pixel comprises a circuit having a photosensor, a switch and an output terminal, wherein said circuit provides a signal on said output terminal only while light is incident on said photosensor and said switch is closed; a fan beam controllable to illuminate the object from at least one position of the fan beam, which position is defined by a scan angle, so that light from said fan beam is reflected by said object to at least one of said pixels,
    a controller that controls the fan beam to illuminate the object at a plurality of scan angles of the fan beam, wherein for each scan angle, while light from the fan beam illuminates the object, the controller simultaneously closes a plurality of the switches and for a pixel that generates a pulse when the pixel's switch is closed, the controller determines a distance from the pixel to the object by triangulation responsive to the scan angle and the position oI the pixel in the semiconductor surface.

15. A 3D camera according to claim 14 wherein said circuits are formed in or on said semiconductor surface.

16. A 3D camera according to claim 14 wherein said circuits are formed as elements of a monolithic integrated circuit.

17. A 3D camera according to claim 14 comprising signal receiving circuitry having a plurality of inputs and wherein pixels for which said switches are simultaneously closed have said output terminals connected to different inputs of said signal receiving circuitry.

18. A 3D camera according to claim 17 wherein said plurality of pixels comprises an array of pixels having rows and columns of pixels, wherein each pixel belongs to one row and one column of said array.

19. A 3D camera according to claim 18 wherein said output terminals of pixels in a same column of pixels are connected to a same input of said signal receiving circuitry.

20. A 3D camera according to claim 19 wherein the controller closes, substantially simultaneously, said switches of all pixels in a same single row of pixels.

21. A 3D camera according to claim 20 wherein the controller sequentially closes, row by row, the switches of all the pixels in a same single row of pixels.

22. A 3D camera according to claim 21 wherein said signal receiving circuitry comprises an encoder and said output terminals of pixels in a same column of pixels are connected to a same input of the encoder.

23. A 3D camera according to claim 18 wherein columns of said semiconductor surface are parallel to the plane of said fan beam for all positions of said fan beam at which said fan beam illuminates said object.

24. A 3D camera according to claim 14 wherein an output of said photosensor is connected to a contact terminal of said switch.

25. A 3D camera according to claim 14 wherein said circuit comprises a comparator having a first input connected to said photosensor, a second input biased with a reference voltage and an output and wherein when light having an intensity greater than a predetermined intensity is incident on said photosensor, voltage on the first input rises above the reference voltage and the comparator generates an output signal.

26. A 3D camera according to claim 25 wherein said output of said comparator is connected to a contact terminal of said switch.

27. A method of measuring distances to regions of an object comprising:
   providing a semiconductor surface having a plurality of light sensitive pixels, each of which provides an output signal responsive to light thereon only while illuminated with the light;
   illuminating said object with light from a fan beam of light having a position defined by a scan angle so that light from the fan beam is reflected by the object to at least one of said plurality of pixels;
   simultaneously sensing signals from a group of pixels in the semiconductor surface to determine which of the pixels in the group is providing a signal;
   determining the scan angle for the pixels in the group of pixels;
   using locations of pixels that provide signals and said determined scan angle to determine distances to regions of said object.

28. A method according to claim 27 wherein said plurality of pixels in the semiconductor surface is arranged in a rectangular array of rows and columns pixels.

29. A method according to claim 28 wherein the group of pixels comprises all pixels in a same row of pixels.

30. A method according to claim 29 and comprising sensing signals from pixels in the semiconductor surface in a plurality of rows of pixels sequentially, row by row.

31. A method according to claim 28 comprising providing a signal sensing means and wherein sensing signals comprises sensing signals from all pixels in a column of pixels on a same input of said sensing means.

* * * * *